US009523595B2

(12) United States Patent
Ishitsuka et al.

(10) Patent No.: US 9,523,595 B2
(45) Date of Patent: Dec. 20, 2016

(54) METHOD OF MANUFACTURING THERMAL FLOW METER

(71) Applicant: Hitachi Automotive Systems, Ltd., Hitachinaka-shi, Ibaraki (JP)

(72) Inventors: Norio Ishitsuka, Tokyo (JP); Masatoshi Ogata, Tokyo (JP); Tsutomu Kono, Tokyo (JP); Tsubasa Watanabe, Tokyo (JP); Shinobu Tashiro, Hitachinaka (JP); Noboru Tokuyasu, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/899,567

(22) PCT Filed: Feb. 7, 2014

(86) PCT No.: PCT/JP2014/052827
§ 371 (c)(1),
(2) Date: Dec. 18, 2015

(87) PCT Pub. No.: WO2014/203556
PCT Pub. Date: Dec. 24, 2014

(65) Prior Publication Data
US 2016/0146652 A1     May 26, 2016

(30) Foreign Application Priority Data
Jun. 20, 2013  (JP) ................................. 2013-129148

(51) Int. Cl.
*G01F 1/684*   (2006.01)
*G01F 1/692*   (2006.01)

(52) U.S. Cl.
CPC ............... *G01F 1/692* (2013.01); *G01F 1/684* (2013.01)

(58) Field of Classification Search
CPC .......... G01F 1/692; G01F 1/684; G01F 1/696; G01F 3/20; G01F 3/225; G01F 15/16; G01F 23/16
See application file for complete search history.

(56) References Cited

U.S. PATENT DOCUMENTS 4,517,838 A * 5/1985 Wachi ................... G01F 1/6847
                                          73/204.22
4,805,452 A * 2/1989 Eiermann ............... G01F 1/692
                                          73/202.5
(Continued)

FOREIGN PATENT DOCUMENTS

JP     7-174599 A     7/1995
JP     2009-36639 A   2/2009
(Continued)

OTHER PUBLICATIONS

International Search Report (PCT/ISA/210) issued in counterpart International Application No. PCT/JP2014/052827 dated May 27, 2014, with English translation (Six (6) pages).
(Continued)

*Primary Examiner* — Mohsen Ahmadi
(74) *Attorney, Agent, or Firm* — Crowell & Moring LLP

(57) ABSTRACT

An objective of the present invention is, in a thermal flow meter having a structure including a resin portion formed in the vicinity of a diaphragm structural portion using a mold, to prevent destruction of the diaphragm structural portion at the time of pressing the mold, in a method of manufacturing the thermal flow meter, including: supporting a gas flow measurement element 200 on support members 102b and 111, the gas flow measurement element 200 including a cavity portion 202 surrounded by a substrate inclined portion 202a inclined to a substrate surface, a diaphragm 201 that covers the cavity portion, and an electrical resistive element formed in the diaphragm 201; and covering the gas
(Continued)

flow measurement element 200 and the support members 102b and 111 with the resin portion 104 formed with the mold, to set the mold 14 such that an acting portion of pressure force by the mold that molds the resin portion 104 is positioned outside the substrate inclined portion 202a in the entire periphery of the diaphragm 201.

4 Claims, 12 Drawing Sheets

(56) References Cited

U.S. PATENT DOCUMENTS

| | | | |
|---|---|---|---|
| 4,972,708 A * | 11/1990 | Wiegleb | G01P 5/12 338/28 |
| 5,396,795 A | 3/1995 | Araki | |
| 2002/0116995 A1* | 8/2002 | Watanabe | G01F 1/6842 73/202.5 |
| 2009/0241654 A1* | 10/2009 | Miyata | G01F 1/68 73/114.74 |
| 2011/0140211 A1 | 6/2011 | Kono et al. | |
| 2013/0192388 A1 | 8/2013 | Kono et al. | |
| 2015/0234393 A1* | 8/2015 | Kehoe | G05D 7/06 137/2 |
| 2015/0300857 A1* | 10/2015 | Ishitsuka | G01F 1/6842 73/114.34 |

FOREIGN PATENT DOCUMENTS

| | | |
|---|---|---|
| JP | 2009-36641 A | 2/2009 |
| JP | 2011-122984 A | 6/2011 |
| JP | 2012-83124 A | 4/2012 |
| JP | 2012-112737 A | 6/2012 |
| JP | 2012-112979 A | 6/2012 |

OTHER PUBLICATIONS

Japanese Office Action issued in counterpart Japanese Application No. 2013-129148 dated Aug. 16, 2016, with unverified English translation (five (5) pages).

* cited by examiner

METHOD OF MANUFACTURING THERMAL FLOW METER

TECHNICAL FIELD

The present invention relates to a thermal flow meter.

BACKGROUND ART

As a background technology related to the present technical field, there is a flow sensor module described in Japanese Patent Application Laid-Open No. 2012-112979 (PTL 1).

PTL 1 describes "a surface of a semiconductor chip CHP1, a wire W1, a lead RD1, a wire W2, an entire principal plane of a semiconductor chip CHP2, and a part of a wire W3 and a lead RD2 excluding a flow detection portion FDU and its vicinity are sealed with a resin MR". Further, "a lead frame LF on which the semiconductor chip CHP1 and the semiconductor chip CHP2 are mounted is sandwiched by the upper mold UM and the lower mold BM through a first space" (see paragraph 0142 and FIG. 18).

Further, PTL 1 describes "a structure in which a part of an upper portion of the semiconductor chip CHP1 is not covered with the resin MR in a cross section of a gas (air) in a flowing direction by making a dimension LR1 of a tip of an insert IPU installed on the upper mold UM larger than a dimension LC1 of the semiconductor chip CHP1" (see paragraph 0279 and FIG. 45).

CITATION LIST

Patent Literature

PTL 1: Japanese Patent Application Laid-Open No. 2012-112979

SUMMARY OF INVENTION

Technical Problem

In the technology disclosed in PTL 1, the mold is pressed against the upper surface of the semiconductor chip through an elastic film in order to prevent a flow detection portion from being covered with the resin. A diaphragm is formed in the semiconductor chip, and a cavity is formed in a back side of the diaphragm. This cavity is formed with an inclined surface inclined with respect to the upper surface of the semiconductor chip.

PTL 1 does not give consideration as to how to decide a pressing position of the mold, for the diaphragm, the cavity, and the inclined surface (hereinafter, referred to as diaphragm structural portion). The diaphragm structural portion is made vulnerable. When pressing force of the mold is applied, bending force is applied to the semiconductor chip, and as a result, this vulnerable portion may be damaged.

In FIG. 45 of PTL 1, the insert is set such that the pressing force is applied to an outside of the diaphragm structural portion. However, in FIGS. 18 and 27 of PTL 1, the upper mold is set such that the pressing force is applied to an inside of the diaphragm structural portion. Then, PTL 1 does not give consideration as to how to arrange the pressing force by the upper mold and the insert, to the diaphragm structural portion.

An objective of the present invention is to prevent destruction of the diaphragm structural portion at the time of pressing the mold in the thermal flow meter having a structure including a resin portion formed in the vicinity of the diaphragm structural portion using a mold.

Solution to Problem

To achieve the above objective, a resin portion of a thermal flow meter of the present invention is molded in a vicinity of a diaphragm structural portion using a mold such that a mold pressing region does not overlap with the diaphragm structural portion.

Advantageous Effects of Invention

According to the present invention, destruction of the diaphragm structural portion caused at the time of pressing the mold can be prevented. Further, the height and the size of the structural portion around a flow detection portion can be made constant. Therefore, a thermal flow meter with high measurement accuracy can be prevented.

Problems, configurations, and effects other than the above-mentioned points will become clear from description of embodiments below.

DESCRIPTION OF EMBODIMENTS

Hereinafter, embodiments of the present invention will be described. Note that, in the present embodiment, a case of a thermal flow meter 300 will be described, which is mounted in an internal-combustion engine of an automobile, and uses air as a gas to be measured 30 will be described. However, the thermal flow meter 300 according to the present invention can be used for a gas other than the air.

Figure 1A:
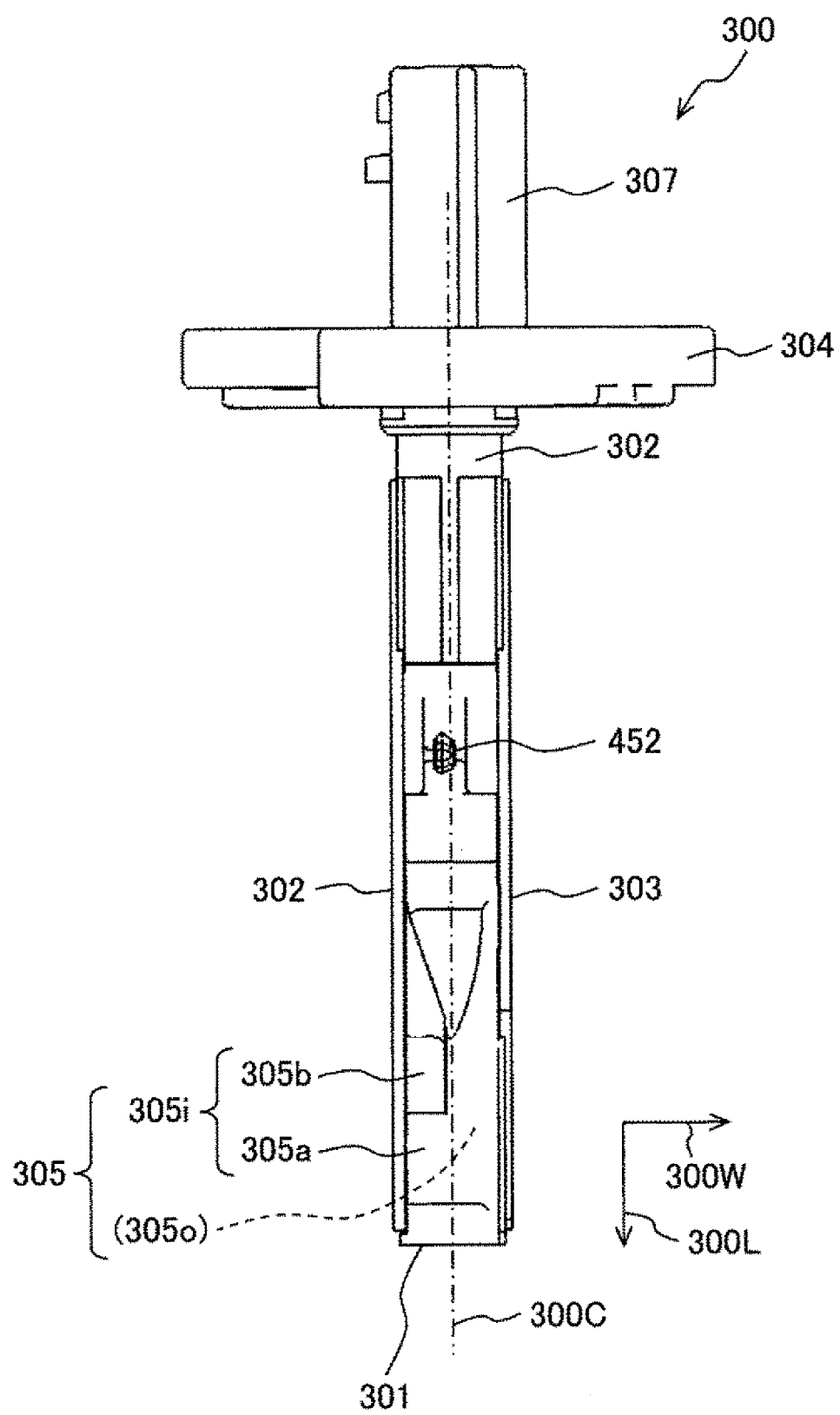
FIG. 1A is a plan view illustrating a top view of a thermal air flow meter according to the present invention.
Figure 1B:
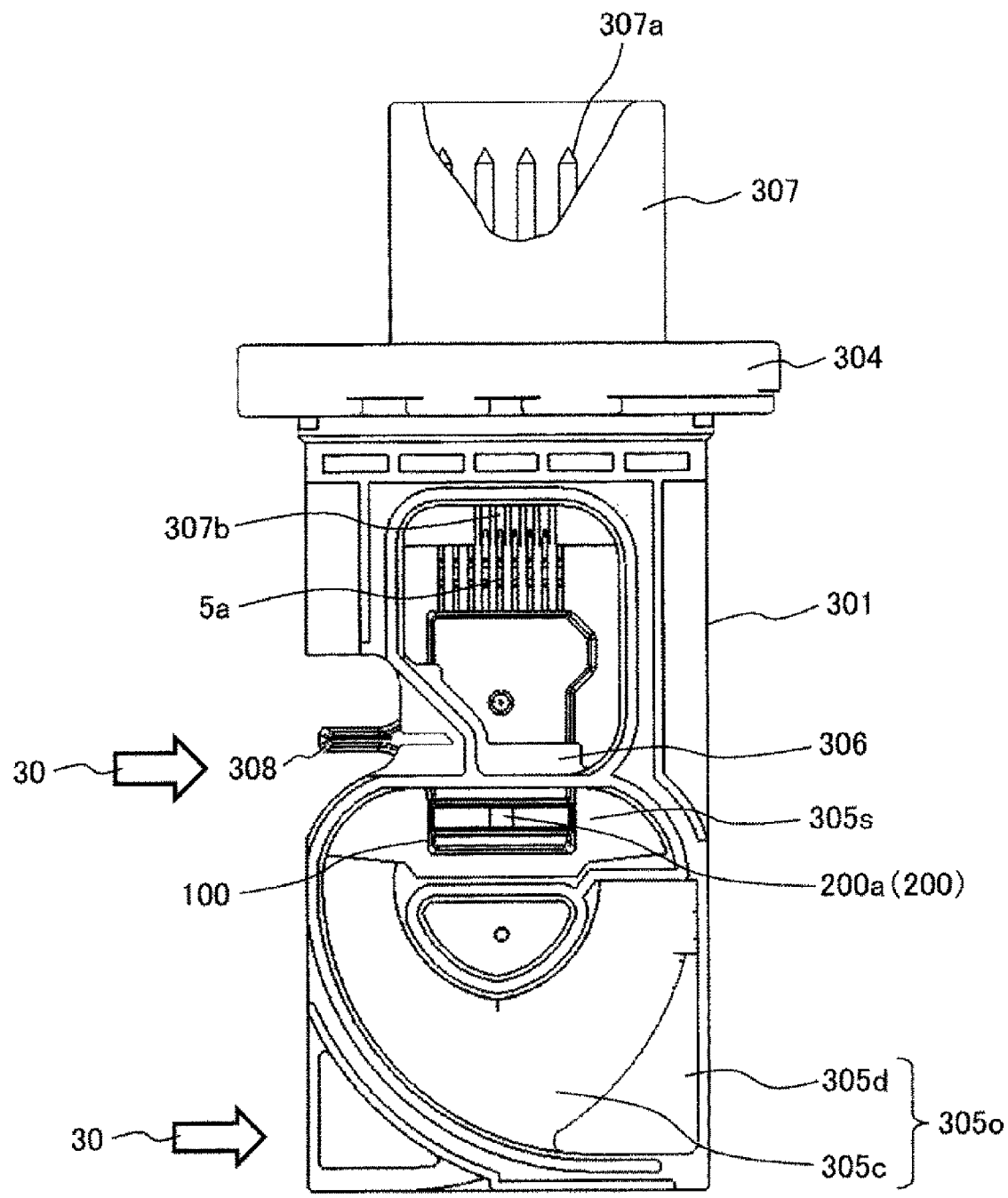
FIG. 1B is a plan view illustrating a side surface of the thermal air flow meter according to the present invention, removing a cover member provided on the side surface.

First, an overall configuration of the thermal air flow meter will be described using FIGS. 1A and 1B. FIG. 1A is a plan view illustrating a top view of the thermal air flow meter 300. FIG. 1B is a plan view illustrating a side surface of the thermal air flow meter 300, removing cover members 302 and 303 provided on the side surface. Note that FIG. 1B illustrates a right side surface of FIG. 1A. Note that the arrow 30 illustrated in FIG. 1B represents a direction of the air flowing in a suction pipe (not illustrated).

The surface of the thermal air flow meter 300 illustrated in FIG. 1A is provided to face an upstream side of a flow of air flowing in the suction pipe. Hereinafter, an up and down direction in the thermal air flow meter 300 will be described, where the upstream side the flow of the air flowing in the suction pipe is up, and a downstream side is down. This up and down direction does not mean an up and down direction in an implemented state of the thermal air flow meter 300 being attached to the internal-combustion engine of an automobile or the like. Further, a length direction 300L and a width direction 300W of the thermal air flow meter 300 are defined as illustrated by the arrows of FIG. 1A. Further, a direction vertical to the length direction 300L and the width direction 300W is defined as a height direction. A reference sign 300C represents a center line in the width direction 300L.

As illustrated in FIG. 1A, thin plate-like cover members 302 and 303 are attached to both side surfaces of a housing (main body) 301 of the thermal air flow meter 300. A flange portion (attaching portion) 304 is fixed to a wall surface of the suction pipe of the thermal air flow meter 300, and a sub-passage 305 that takes in a part of the air flowing in the suction pipe is provided at a tip end side of the housing 301. An inlet opening 305a of the sub-passage 305 is provided through the entire width direction 300L of the housing 301. An inlet-side passage portion 305i of the sub-passage 305 is narrowed toward a left side of the center line 300C as it goes to the downstream side from the inlet opening 305a. An outlet-side passage portion 305o of the sub-passage 305 is formed at a depth side of the inlet-side passage portion 305i in a left-side portion of the inlet-side passage portion 305i from the center line 300C. The outlet-side passage portion 305o cannot be illustrated in FIG. 1A. Therefore, the bracket is attached and the leadout line is illustrated by a dotted line. The sub-passage 305 is configured from the inlet-side passage portion 305i, the outlet-side passage portion 305o, and a flow measurement passage portion 305s (described below) provided between the inlet-side passage portion 305i and the outlet-side passage portion 305o in a flowing direction of the air, and in which a flow detection portion 200a of a circuit package 400 is arranged.

A connector portion 307 is provided in the flange portion 304 at a side opposite to the side where the sub-passage 305 is provided. A signal line (communication line) connected to an external device (for example, an engine control device) is connected to the connector portion 307.

As illustrated in FIG. 1B, the outlet-side passage portion 305o and the flow measurement passage portion 305s that configure the sub-passage 305 are provided at a tip end side (a lower side of the sheet surface) of the main body 301. Although not illustrated in FIG. 1B, the inlet-side passage portion 305i of the sub-passage 305 is provided at a depth side of the outlet-side passage portion 305o. The flow measurement passage portion 305s is formed to extend over the both sides in the width direction through the center line 300C illustrated in FIG. 1A, so that a downstream end of the inlet-side passage portion 305i formed at a one (left) side surface side of the center line 300C, and an upstream end of the outlet-side passage portion 305o formed at the other (right) side surface side of the center line 300C communicate with the flow measurement passage portion 305s.

A circuit package 100 is arranged between the sub-passage 305 and the flange portion 304. In the present embodiment, the circuit package 100 is fixed to the housing 301 in a fixing portion 306 with a resin that forms the housing 301. Gaps in which the air flows are respectively provided between wall surfaces of the flow measurement passage portion 305s and a surface to which the flow detection portion 200a of the circuit package 100 is exposed and a back surface at an opposite side to the surface. That is, the circuit package 100 is arranged in an intermediate portion of the flow measurement passage portion 305s in the width direction 300L. Further, as illustrated in FIG. 1B, the circuit package 100 is arranged such that the flow detection portion 200a faces the side surface side in the thermal air flow meter 300, where the outlet-side passage portion 305o is formed.

Connection terminals 307a electrically connected with and for performing communication with the signal line (communication line) that connects the thermal air flow meter 300 to the external device (an engine control device, for example) is provided in the connector portion 307. The connection terminals 307a are electrically connected with terminals 307b exposed to an inside of the housing 301, and are electrically connected to leads 102b pulled out of the circuit package 100 through the terminals 307b. The leads 102b configure input/output terminals of an LSI 103 and an intake air temperature detection element 104.

Figure 2A:
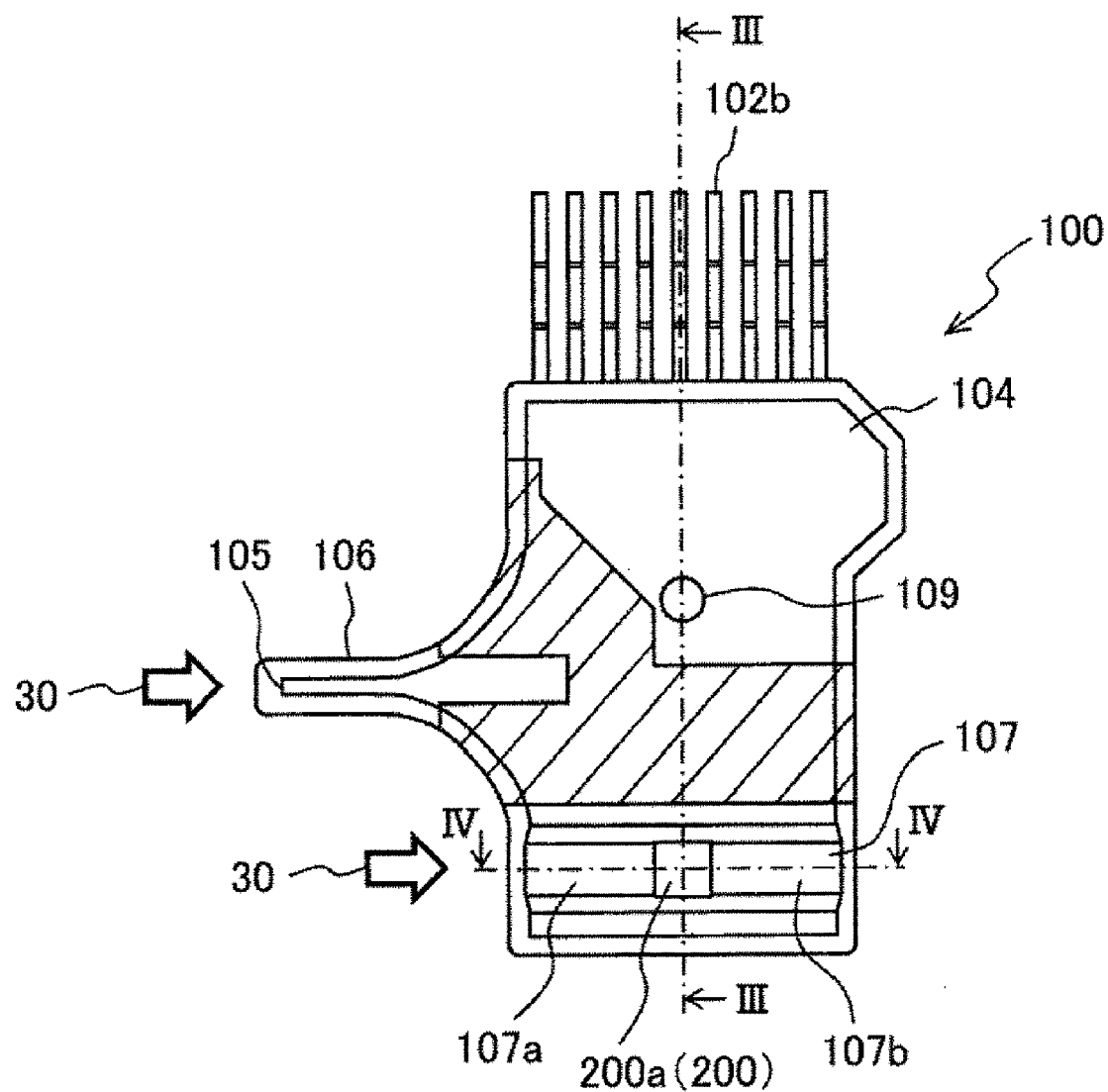
FIG. 2A is a plan view illustrating an implementation configuration of a circuit package according to the present invention after seal of a resin.
Figure 2B:
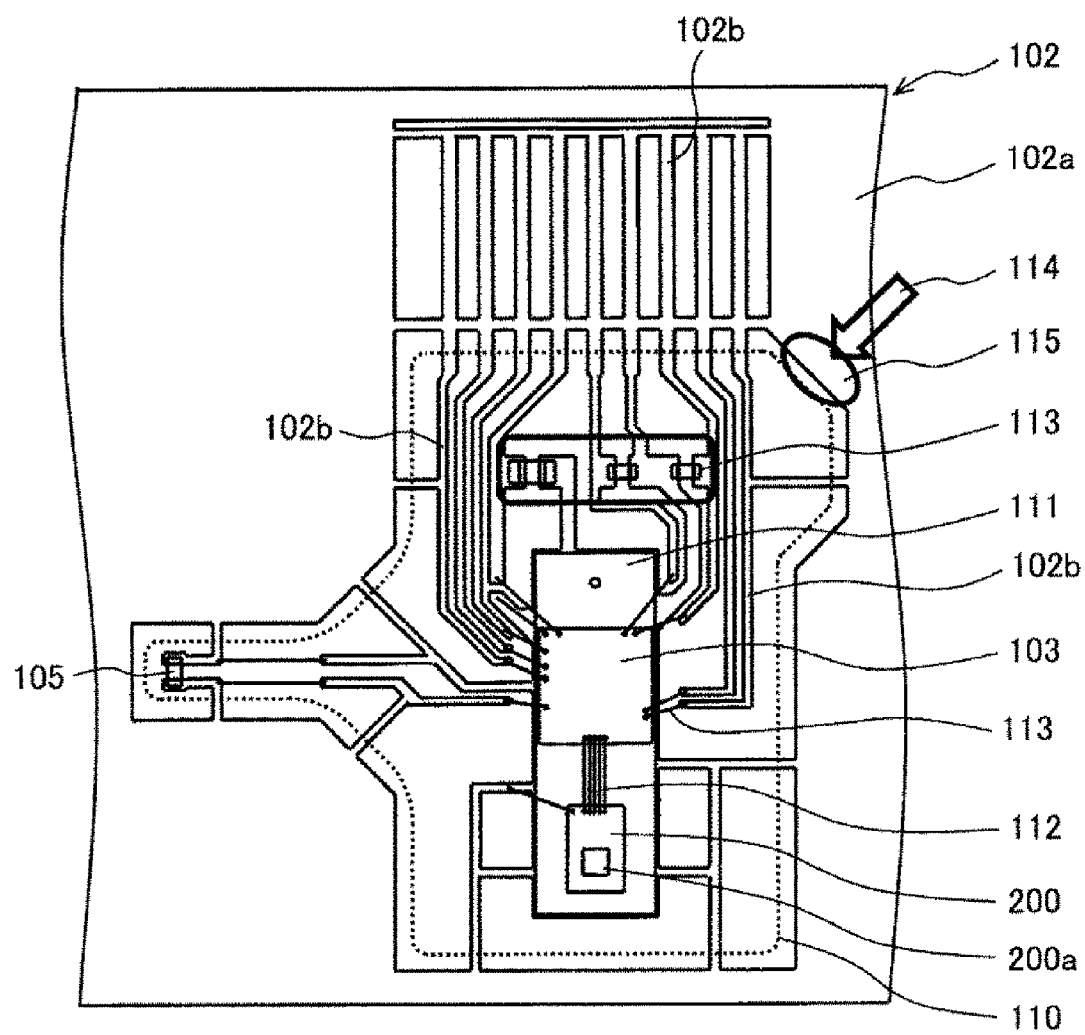
FIG. 2B is a plan view illustrating a lead frame of the circuit package, and a mount state of a circuit chip and a sensor chip of the lead frame.
Figure 3:
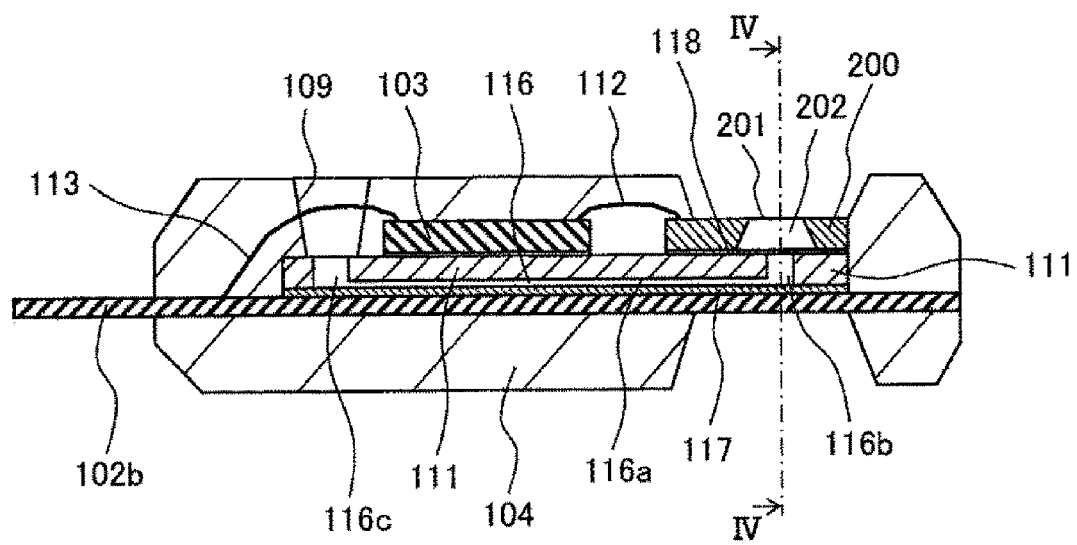
FIG. 3 is a longitudinal-direction sectional view (the A-A cross section of FIG. 2A) in an embodiment of an air flow sensor according to the present invention.
Figure 4:
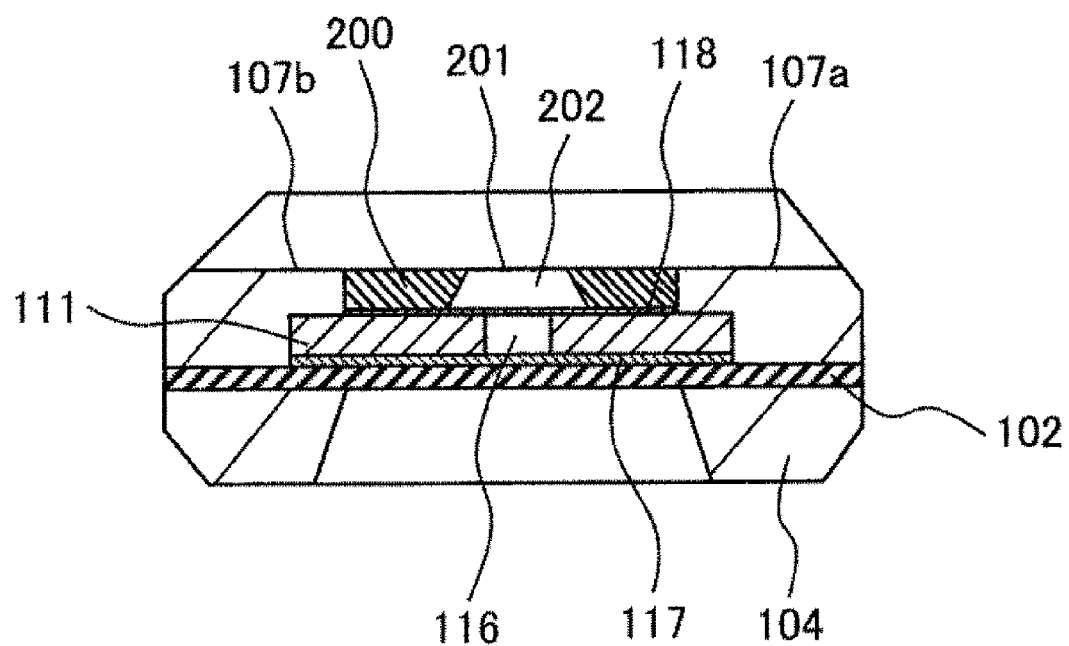
FIG. 4 is a transverse-direction sectional view (the B-B cross section of FIG. 2A) in an embodiment of the air flow sensor according to the present invention.

Next, the circuit package 100 will be described using FIGS. 2A to 4. FIG. 2A is a plan view illustrating an implementation configuration (appearance) of the circuit package 100 after seal of a resin. FIG. 2B is a plan view illustrating a mount state of the lead frame 102 of the circuit package 100, and a circuit chip and a sensor chip of the lead frame 102. FIG. 3 is a sectional view illustrating a cross section of FIG. 2A, and FIG. 4 is a sectional view illustrating a IV-IV cross section of FIG. 2A and FIG. 3.

The circuit package 100 is configured from an air flow measurement element 200, a resin mold portion 104 that covers the air flow measurement element 200, the lead 102b for taking out an electrical signal, and the intake air temperature detection element 105. Details of the air flow measurement element 200 will be described below.

The circuit package 100 has the flow detection portion 200a and the LSI 103 built in. The flow detection portion 200a and the LSI 103 are molded with a thermosetting resin, and are integrally formed. The flow detection portion 200a and the LSI 103 will be described below.

The circuit package 100 includes a protruding portion 106 exposed from the housing 302. The protruding portion 106 is provided with the intake air temperature detection element 105 including a function to detect the temperature of a gas to be measured (air in the present embodiment) 30.

A measurement flow path surface 107 that functions as a surface for allowing the air 30 to flow is formed on a surface of the circuit package 100 in a shape extending long from an upstream end to a downstream end of the circuit package 100 in the flowing direction of the air 30. The flow detection portion 200a of the air flow measurement element 200 is exposed to a part of the measurement flow path surface 107. The flow detection portion 200a performs heat transfer to/from the air 30, measures a state of the air 30, for example, a flow velocity of the air 30, and outputs an electrical signal that indicates a flow rate of the air 30 flowing in the main passage.

A press print 108 of the mold remains in the resin mold portion 104 in a position corresponding to the flow detection portion 200a on a back surface of the measurement flow path surface 107, as illustrated in FIG. 3. The flow detection portion 200a needs to avoid being covered with the resin of the resin mold portion 104 in order to exchange heat to/from the air 30. Therefore, the mold is pressed against both surfaces of the flow detection portion 200a and its back surface to prevent inflow of the resin to the flow detection portion 200a. Therefore, an insert 14 described below is provided to come in contact with the air flow measurement element 200 at the side of the flow detection portion 200a, and a lower mold 10 is provided to come in contact with the lead 102b on the back surface of the flow detection portion 200a (see FIG. 5B).

FIG. 2A illustrates an opening 109 communicating with a cavity 202 in a back surface of a semiconductor diaphragm 201.

The hatched portion illustrated on the appearance of the circuit package 100 indicates a surface covered with the resin that forms the housing 302. The hatched portion is covered with the resin of the housing 302, so that the circuit package 100 is fixed to the housing 302. Therefore, a resin mold process of the main body 302 and a resin mold process of the circuit package 100 are performed in different processes. To be specific, after the circuit package 100 is completed by the resin mold process of the circuit package 100, the resin mold process of the main body 302 is performed.

In FIG. 2B, an inside of a broken line portion 110 is a portion covered with the mold used at the time of mold formation of the circuit package 100.

The lead frame 102 has a configuration in which the lead 102b is mechanically connected to and supported by a support frame 102a. A plate 111 is mounted in a center of the lead 102b. The air flow measurement element 200 in which the chip-like flow detection portion 200a is configured, and the LSI 103 that configures a processing unit that processes an electrical signal detected in the flow detection portion 200a are mounted on the plate 111. The diaphragm 201 is provided in the air flow measurement element 200. Terminals of the air flow measurement element 200 and the LSI 103 are electrically connected with a wire 112. Further, terminals of the LSI 103 and corresponding leads 102b are electrically connected with a wire 113. Further, a chip-like circuit component (circuit chip) 113 is connected between two leads 102b in a lead portion positioned between a lead portion that serves as a connection terminal of the circuit package 100 and the plate 111.

The plate 111 is supported by the leads 102b. A lead surface (not illustrated) having an equal area to the plate 111 is provided to a lower surface of the plate 111, and the plate 111 is mounted on the lead surface. Note that this lead surface is grounded.

The leads 102b configure a first support member for the air flow measurement element 200, and the plate 111 configures a second support member. In the present embodiment, an intermediate plate member (plate member) configured from the plate 111 is configured between the leads 102b and the air flow measurement element 200.

As illustrated in FIG. 3, the plate 111 is glued on the lead surface with a first adhesive tape 117. The air flow measurement element 200 and the LSI 103 are glued on the plate 111 with a second adhesive tape 118.

As can be seen from FIGS. 2A to 4, the measurement flow path surface 107 has a groove shape, and is provided to penetrate the entire width from an upstream-side side portion to a downstream-side side portion in the flowing direction of the air. At this time, a surface 107a of the measurement flow path surface 107 positioned in an upstream side and a surface 107b positioned at a downstream side, of the flow detection portion 200a configure a groove-shaped bottom surface at the same height as a surface of the flow detection portion 200a. Accordingly, the flow of the air is not disturbed in the flow detection portion 2a, and an accurate flow rate can be detected. Further, a side surface of the groove shape 107 has a rectification effect for the air flowing in the flow detection portion 200a.

In the present embodiment, only a side where the wire (wiring member) 112 is connected, of the surface of the air flow measurement element 200, is covered with the resin of the resin mold portion 104. The configuration is not limited thereto, and an end portion at an opposite side to the side covered with the resin of the resin mold portion 104 in FIG. 3 may be covered with the resin of the resin mold portion 104. However, since the air flow measurement element 200 itself is small, only one end portion side of the surface of the air flow measurement element 200 may be covered with the resin like FIG. 3, if there is not sufficient end portion at the opposite side in an arrangement of the mold described below.

The leads 102b are support members (support bodies) of the plate 111, the air flow measurement element 200, and the LSI 103, and also function as electrical wiring of the LSI 103 and the intake air temperature detection element 105. The electrical wiring configured from the leads 102b is electrically connected to the connection terminals 307a of the connector portion 307 through the leads 102b exposed from the resin mold portion 104 in FIG. 2A.

A ventilation passage 116 that allows the cavity 202 and an outside to communicate into each other is formed in the plate 111 so that the cavity 202 is not sealed. The ventilation passage 116 is formed of a groove 116a and through holes 116b and 116c. One end portion of the ventilation passage 116 communicates into the cavity 202 with the through hole 116b. The other end portion of the ventilation passage 116 communicates into an outside through the through hole 116c and a through hole 109 formed in the resin mold portion 104. This plate 111 may be glass or a resin.

In the present embodiment, the air flow measurement element 200 and the LSI 103 are supported by the leads 102b and the plate 111, and the leads 102b and the plate 111 configure a support member (support element) of the air flow measurement element 200 and the LSI 103.

FIG. 2B illustrates a press-fitting direction of the resin for molding the resin mold portion 104 by an arrow 114. The lead frame 102 in which the circuit components are mounted are covered with the mold, a press-fitting hole 115 for injecting the resin into the mold is provided in the circled position, and the thermosetting resin is injected into the mold from the direction of the arrow 114.

Figure 5A:
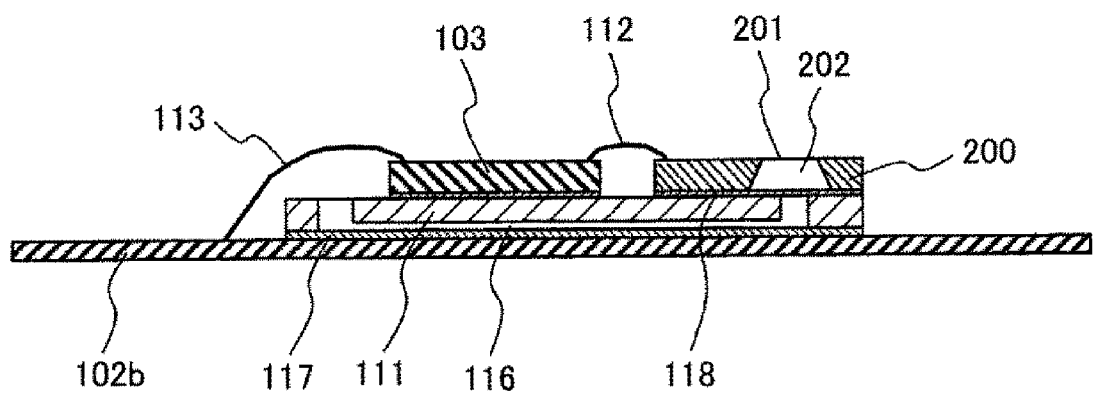
FIG. 5A is a longitudinal-direction sectional view illustrating a manufacturing method in an embodiment of an air flow sensor according to the present invention, and a diagram of the A-A cross section of FIG. 2A illustrating a state before mold with a resin is performed.
Figure 5B:
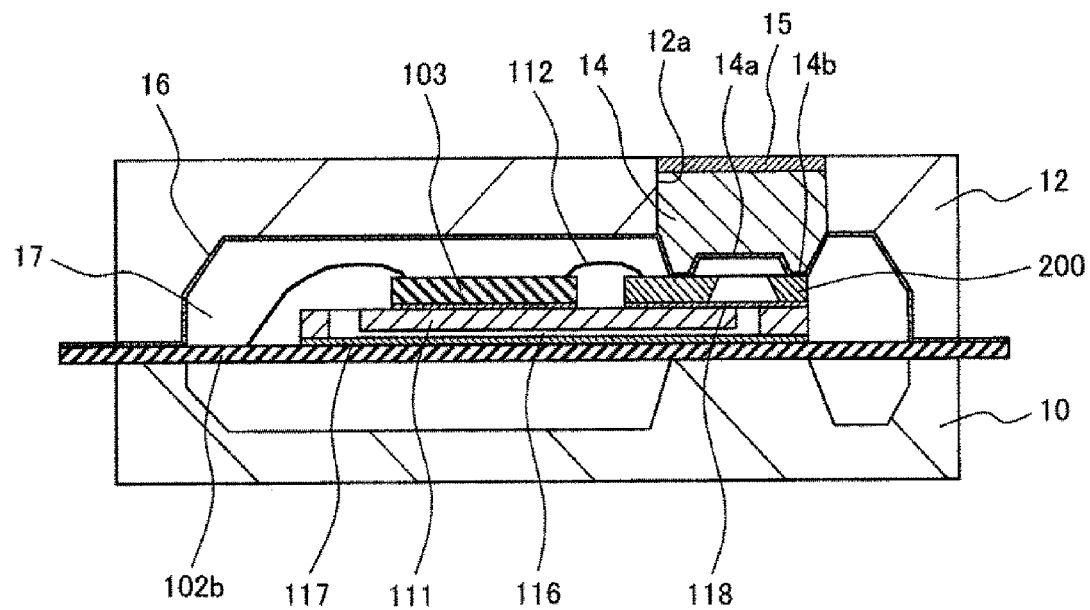
FIG. 5B is a sectional view illustrating a state in which an assembly that is an air flow measurement element and an LSI assembled in a lead frame is installed in a mold.
Figure 5C:
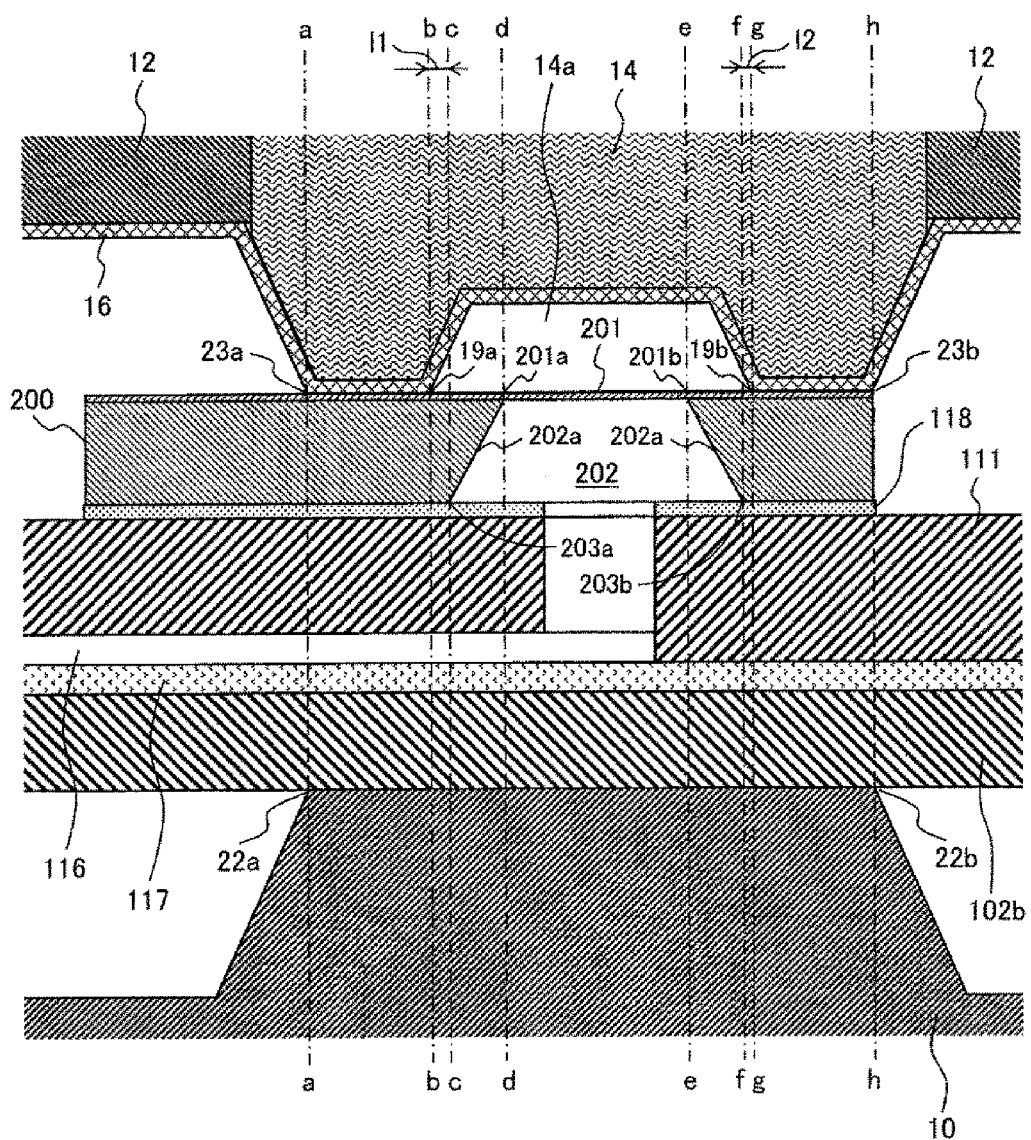
FIG. 5C is a sectional view illustrating an enlarged vicinity of an insert and the air flow measurement element in FIG. 5B.
Figure 6:
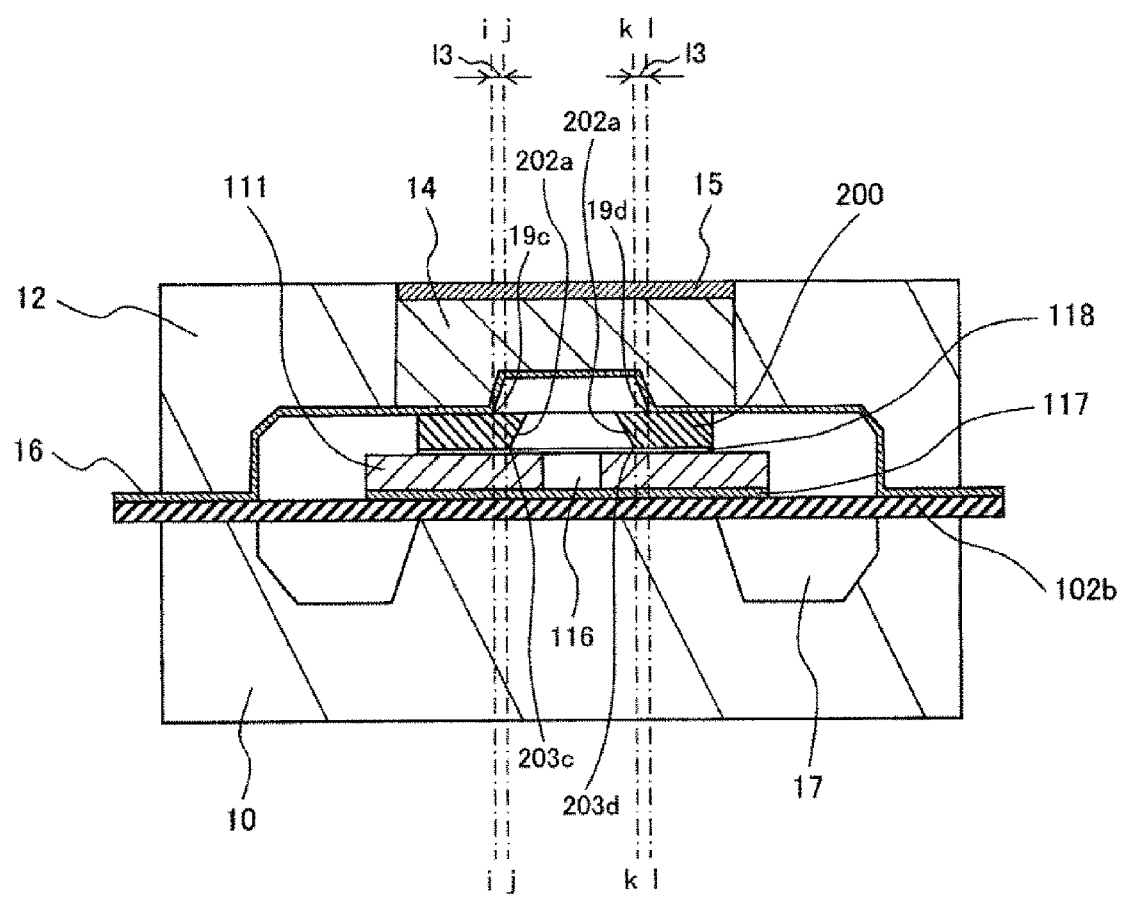
FIG. 6 is a transverse-direction sectional view in an embodiment of an air flow sensor according to the present invention at the time of pressing a mold.

Next, a method of manufacturing the circuit package 100 will be described using FIGS. 5A, 5B, and 6. FIG. 5A illustrates a state before the resin mold of the resin mold portion 104 is performed in the III-III cross section of FIG. 2A. FIG. 5B is a sectional view illustrating a state in which an assembly of the air flow measurement element 200 and the LSI 103 assembled to the lead frame 102 is installed in molds 10 and 12. FIG. 5C is a diagram illustrating an enlarged vicinity of the insert 14 and the air flow measurement element 200 in FIG. 5B. FIG. 6 is a transverse-direction sectional view of at the time of pressing the mold, and a diagram illustrating a relationship between a push-in position of an insert 14 and a substrate inclined portion 20 in the IV-IV cross section in FIG. 2A.

The plate 111 is glued on the lead frame 102 using a first adhesive tape 117. Next, the air flow measurement element 200 and the LSI 103 are glued on the plate 111 using a second adhesive tape 118. At this time, the thickness of the second adhesive tape 118 is made thinner than the thickness of the first adhesive tape 117. That is, the thickness dimension of the second adhesive tape 118 is made smaller than the thickness dimension of the first adhesive tape 117. Next, the air flow measurement element 200 and the LSI 103 are electrically connected with the wire 112, and the LSI 103 and the lead 102b are electrically connected with the wire 113. After that, as illustrated in FIG. 5B, the assembly assembled as illustrated in FIG. 5A is put in the mold provided with the upper mold 12, the lower mold 10, the insert 14, a height adjustment mechanism 15, and a resin film 16.

The mold includes the upper mold 12 that covers the side where the air flow measurement element 200 is provided with respect to the lead frame 102 and the plate 111, the lower mold 10 that covers the opposite side, and the insert 14 assembled to an opening portion 12a provided in a portion of the upper mold 12, the portion facing the diaphragm 201, to cover the diaphragm 201. In the insert 14, a recessed portion 14a is formed in the portion facing the diaphragm 201, the portion facing the diaphragm 201 and the diaphragm 201 are in a non-contact state, and a protruding portion 14b that applies pressure force to the air flow measurement element 200 is provided in a periphery of the recessed portion 14a.

After the mold is set, the cavity portion 17 is filled with the resin to form the resin mold portion 104, and the structure of FIG. 3 is manufactured.

In this case, the height of the insert 14 is adjusted, and the resin is prevented from flowing out to the vicinity of the diaphragm 201. Further, as illustrated in FIG. 5C, inside-insert push-in positions 19a and 19b of the insert 14 are set not to overlap with a substrate inclined portion 202a formed in a periphery of the diaphragm 201. At this time, the inside-insert push-in positions 19a and 19b are set in consideration of the thickness of the resin film 16, and include the thickness of the resin film 16 in an inside-insert push-in range. That is, the inside-insert push-in positions 19a and 19b of the insert 14 are respectively positioned outside opening edges 21a and 21b of the cavity 202 of the air flow measurement element 200. Accordingly, in a direction along a surface of the diaphragm 201, an interval 11 (a distance between a line segment bb and a line segment cc) is provided between the inside-insert push-in position 19a and a position of the opening edge 203a of the cavity 202, and an interval 12 (a distance between a line segment ff and a line segment gg) is provided between the inside-insert push-in position 19b and a position of the opening edge 203b of the cavity 202.

Note that, in FIG. 5C, a line segment aa is a line segment that passes through an outside-insert push-in position 23a by the insert 14. The line segment bb is a line segment that passes through the inside-insert push-in position 19a by the insert 14. The line segment cc is a line segment that passes through the opening edge 203a of the substrate inclined portion 202a that forms the cavity 202. A line segment dd is a line segment that passes through an edge 201a of the diaphragm 201. A line segment ee is a line segment that passes through an edge 201b of the diaphragm 201. The line segment ff is a line segment that passes through the opening edge 203b of the substrate inclined portion 202a that forms the cavity 202. The line segment gg is a line segment that passes through the inside-insert push-in position 19b by the insert 14. A line segment hh is a line segment that passes through the outside-insert push-in position 23b by the insert 14.

As illustrated in FIG. 6, in a transverse section, inside-insert push-in positions 19c and 19d of the insert 14 are respectively positioned outside opening edges 203c and 203d of the cavity 202 of the air flow measurement element 200. Accordingly, an interval 13 (a distance between a line segment ii and a line segment jj) is provided between the inside-insert push-in position 19c and a position of the opening edge 203c of the cavity 202, and an interval 13 (a distance between a line segment kk and a line segment 11) is provided between the inside-insert push-in position 19d and a position of the opening edge 203d of the cavity 202. At this time, the inside-insert push-in positions 19c and 19d are set in consideration of the thickness of the resin film 16, and include the thickness of the resin film 16 in the inside-insert push-in range.

Further, as illustrated in FIG. 5C, the outside-insert push-in position 23a and a push-in end portion 22a of the lower mold are set to nearly the same position in a surface direction of the diaphragm 201, and the outside-insert push-in position 23b and a push-in end portion 22b of the lower mold are set to nearly the same position in the surface direction of the diaphragm 201. At this time, the outside-insert push-in positions 23a and 23b are set in consideration of the thickness of the resin film 16, and include the thickness of the resin film 16 in an outside-insert push-in range.

Note that the line segment ii is a line segment that passes through the inside-insert push-in position 19c by the insert 14. The line segment jj is a line segment that passes through the opening edge 203c of the substrate inclined portion 202a that forms the cavity 202. The line segment kk is a line segment that passes through the opening edge 203d of the substrate inclined portion 202a that forms the cavity 202. The line segment 11 is a line segment that passes through the inside-insert push-in position 19d by the insert 14.

The opening edges of the diaphragm 201 and the cavity 202 are respectively formed into squares. Therefore, the edges 201a and 201b of the diaphragm 201 are linearly formed and are in parallel. Two edges that connect the edges 201a and 201b, and are perpendicular to the edges 201a and 201b are linearly formed, and are in parallel. Further, each of the opening edges 203a, 203b, 203c, and 203d of the cavity 202 is linearly formed. Further, the opening edges 203a and 203b are formed in parallel, and the opening edges 203c and 203d are formed in parallel. Further, the opening edges 203a and 203b, and the opening edges 203c and 203b vertically intersect.

After the resin is injected into the mold set as described above, and the resin mold portion 104 is formed, the unnecessary lead frame 102 is cut, and the thermal air flow meter 300 is completed.

Next, functions and effects of the present embodiment will be described.

In the present embodiment, the resin mold portion 104 in the periphery of the flow detection portion 200a, which influences the flow of the air, is manufactured using a mold. Therefore, the resin mold portion 104 can be manufactured with less variation in the height and spread of the resin mold portion for each product. Accordingly, a thermal flow meter with highly accurate measurement can be provided.

Figure 7:
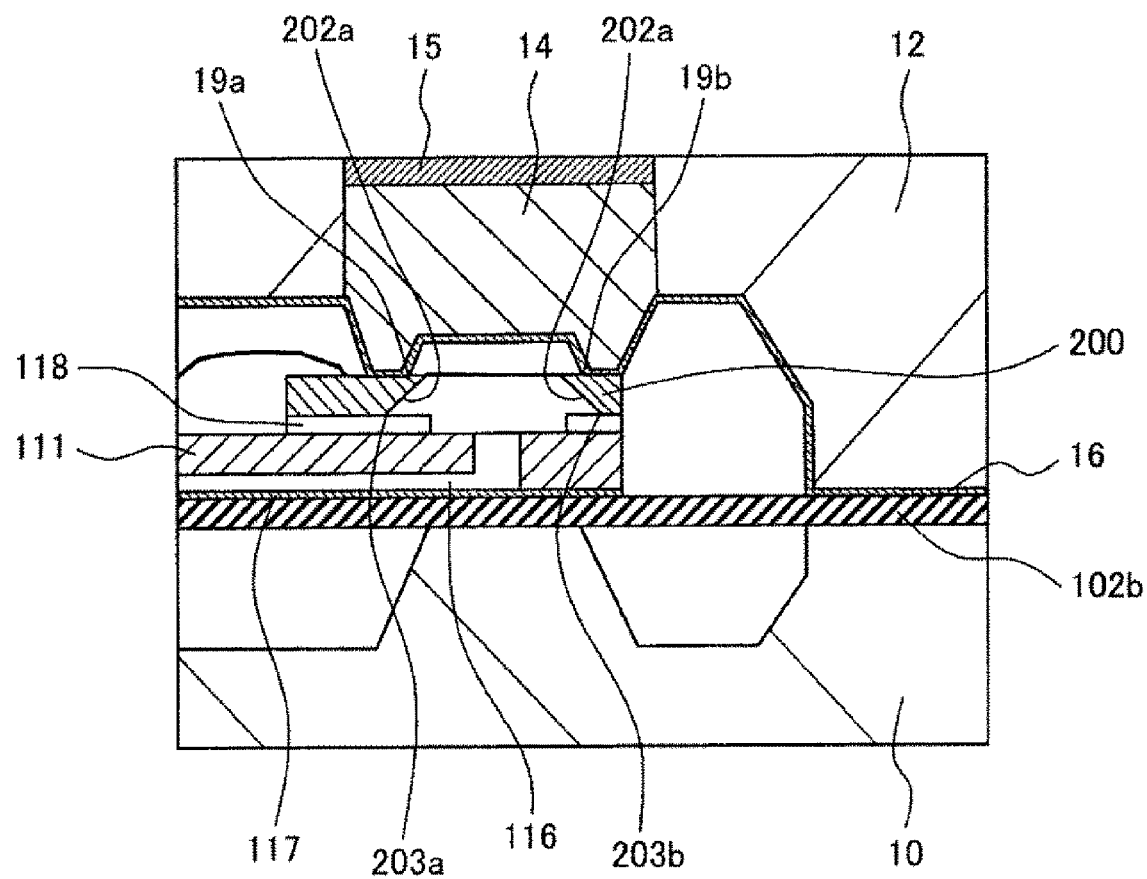
FIG. 7 is a sectional view illustrating an implement structure and mold arrangement in which a flow detection portion is easily destructed.
Figure 8:
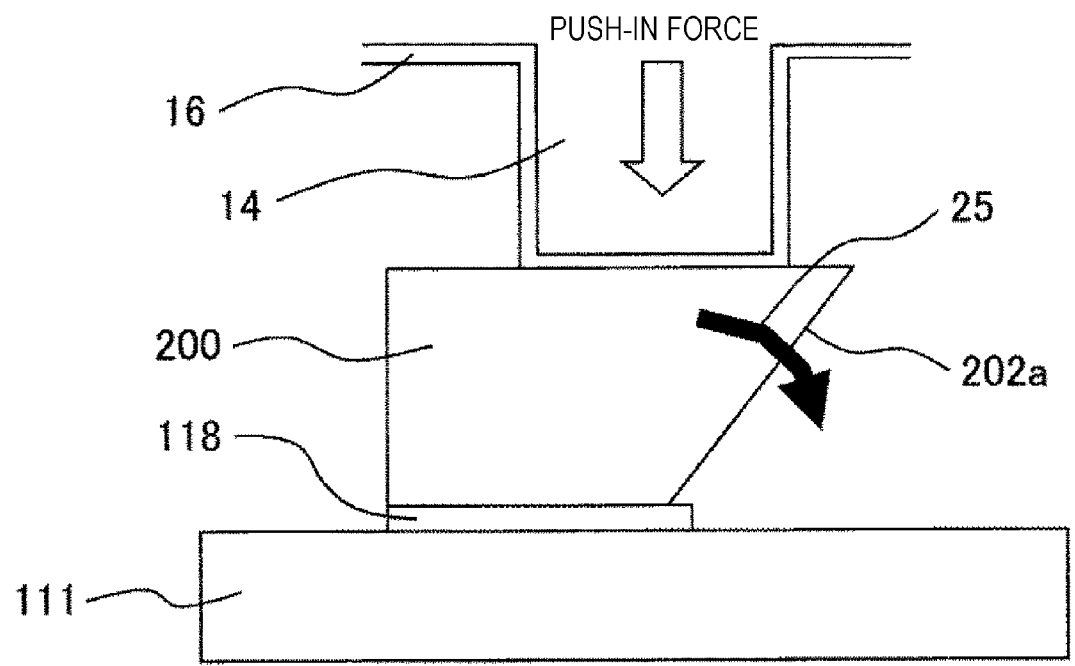
FIG. 8 is a diagram illustrating a mechanism of when the flow detection portion is destructed.
Figure 9:
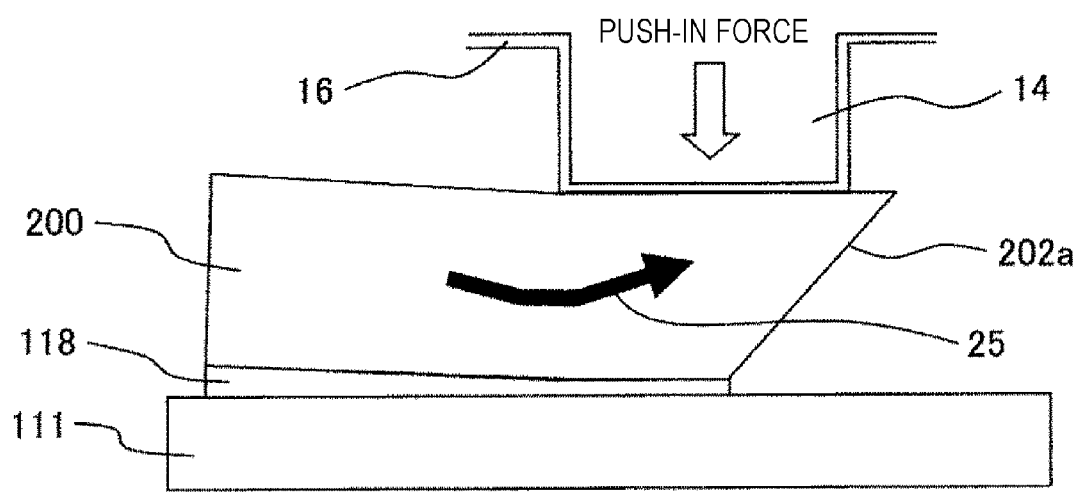
FIG. 9 is a diagram illustrating a mechanism of when the flow detection portion is destructed due to deformation of an adhesive tape.

Further, in the present embodiment, the inside-insert push-in positions 19a, 19b, 19c, and 19d of the insert 14 are set not to overlap with the substrate inclined portion 202a formed in the periphery of the diaphragm 201, as illustrated in FIGS. 5B and 6. A case where the inside-insert push-in positions 19a, 19b, 19c, and 19d overlap with the substrate inclined portion 202a will be described using FIGS. 7, 8, and 9. FIG. 7 is a sectional view illustrating a mold arrangement in which the diaphragm 201 is easily destructed. FIG. 8 is a diagram illustrating a mechanism of when the flow detection portion 200a is destructed. FIG. 9 is a diagram illustrating a mechanism of when the flow detection portion 200a is destructed due to deformation of the adhesive tape.

As illustrated in FIG. 8, push-in force of the insert 14 is applied to the flow detection portion 200a, and a stress due to bending deformation illustrated by the arrow 25 is generated in the substrate inclined portion 202a. Accordingly, the diaphragm structural portion including the diaphragm 201 and the substrate inclined portion 202a formed in the periphery of the diaphragm 201 for configuring the diaphragm 201 are destructed, and the flow detection portion 200a is damaged. In the present embodiment, the inside-insert push-in positions 19a, 19b, 19c, and 19d of the insert 14 are set not to overlap with all of positions (entire periphery) of the substrate inclined portion 202a of the flow detection portion 200a. Accordingly, in the present embodiment, the destruction of the diaphragm structural portion of the flow detection portion 200a can be suppressed.

Further, in the present embodiment, the first adhesive tape 117 and the second adhesive tape 118 are used. These adhesive tapes are soft materials in a temperature range (about 180 degrees) of at the time of mold. A pressing region by the insert 14 is only near the diaphragm 201 of the flow detection portion 200a due to the existence of the wire 112, and this is partial pressing. When the second adhesive tape 118 is thick, the adhesive tape in the pressing region is deformed by the partial pressing as illustrated in FIG. 9, and a region that is not pushed in is not deformed. Therefore, curvature deformation is caused in the flow detection portion 200a, and the flow detection portion 200a may be destructed. Therefore, the second adhesive tape 118 is favorably thin in order to suppress the curvature deformation of the flow detection portion 200a. However, the total thickness of the lead 102b, the first adhesive tape 117, the second adhesive tape 118, the plate 111, and the air flow measurement element 200 differs in each product, and the variation in the total thickness reaches up to several ten µm. When the thickness dimension is small, the resin that forms the resin mold portion 104 is likely to leak. When the thickness dimension is large, an excessive stress is applied to the flow detection portion 200a, and the flow detection portion 200a is destructed. That is, the variation in the total thickness dimension, which differs in each product, needs to be absorbed in somewhere. While the first adhesive tape 117 and the second adhesive tape 118 play the role, it is favorable that the second adhesive tape 118 is thin. Therefore, the first adhesive tape 117 is made thicker than the second adhesive tape 118, so that the variation in the total thickness dimension is absorbed.

Further, in the present embodiment, the outside-insert push-in positions 23a and 23b and the lower mold push-in end portions 22a and 22b nearly accord with each other. If the outside-insert push-in positions 23a and 23b and the lower mold push-in end portions 22a and 22b do not accord, the point where force is applied and the support point are different. Therefore, the curvature deformation is caused in the flow detection portion 200a (especially, the diaphragm 201) at the time of pushing in the insert 14, and the flow detection portion 200a is deformed. In the present embodiment, the outside-insert push-in positions 23a and 23b and the lower mold push-in end portions 22a and 22b nearly accord with each other. Therefore, the destruction of the flow detection portion 200a can be suppressed.

Note that one or both of the first adhesive tape 117 and the second adhesive tape 118 can be configured from an adhesive. In this case, it is good to adjust the thickness of a layer of the adhesive.

As described above, in the present embodiment, in the air flow measurement element 200, the cavity portion 202 surrounded by the substrate inclined portion 202a inclined to the substrate surface such that the cross section vertical to the substrate surface is reduced from one substrate surface side to the other substrate surface side, the diaphragm 201 that covers the cavity portion 202 at the other substrate surface side, and electrical resistive elements 608, 652, 654, 656, and 658 formed in the diaphragm 201. The air flow measurement element 200 is supported on the support members 102 and 111. The thermal flow meter 300 includes the circuit package 100 in which the air flow measurement element 200 and the support members 102 and 111 are covered with the resin portion 104 formed of a mold, and the sub-passage that takes in a part of the gas flowing in the main passage. The circuit package 100 is housed in the housing 301 such that the diaphragm 201 is arranged in the sub-passage 305. At this time, the mold 14 is set such that an acting portion of the pressure force by the mold 14 that molds the resin portion 104 is positioned outside the substrate inclined portion 202a in the entire periphery of the diaphragm 201.

Figure 10:
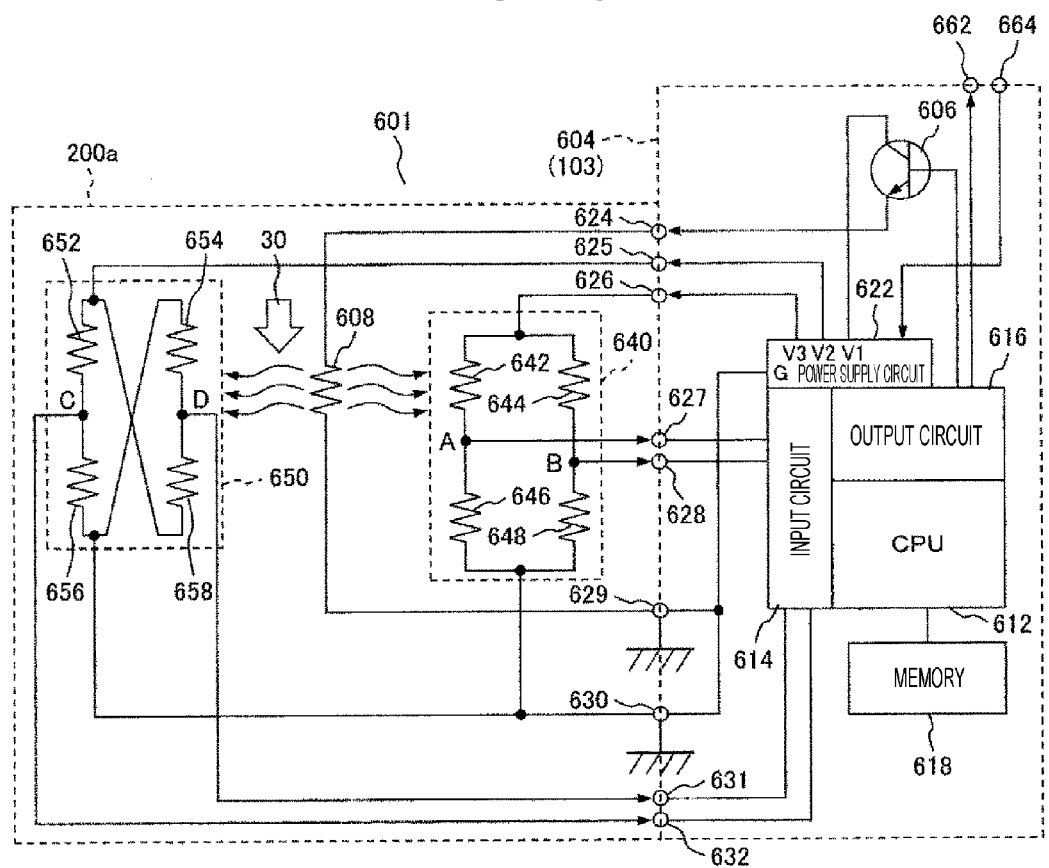
FIG. 10 is a circuit diagram illustrating a flow detection circuit of a thermal air flow meter.

Next, a flow detection circuit 601 of the thermal air flow meter 300 will be described using FIG. 10. FIG. 10 is a circuit diagram illustrating the flow detection circuit 601 of the thermal air flow meter 300.

The flow detection circuit 601 includes the flow detection portion 200a that includes a heat-generating element 608, and a processing unit 604. The processing unit 604 is realized by the above-described LSI 103. The processing unit 604 controls a calorific value of the heat-generating element 608 of the flow detection portion 200a, and outputs a signal that indicates the flow rate through a terminal 662, based on an output of the flow detection portion 200a. The processing unit 604 includes a central processing unit (hereinafter, written as CPU) 612, an input circuit 614, an output circuit 616, a memory 618 that holds data that indicates relationships between a correction value and a measurement value, and the flow rate, and a power supply circuit 622 that supplies a constant voltage to necessary circuits. A direct-current power is supplied from an external power supply such as an on-board battery to the power supply circuit 622 through a terminal 664 and a ground terminal (not illustrated).

A voltage V1 is supplied from the power supply circuit 622 to a collector of a transistor 606 that configures a current supply circuit of the heat-generating element 608, and a control signal is applied from the CPU 612 to a base of the transistor 606 through the output circuit 616. The current is supplied from the transistor 606 to the heat-generating element 608 through a terminal 624, based on the control signal. The processing unit 604 controls the calorific value of the heat-generating element 608 such that the temperature of the air 30 becomes higher than an initial temperature by a predetermined temperature, for example, 100° C.

The flow detection portion 200a includes a heat generation control bridge 640 for controlling the calorific value of the heat-generating element 608, and a flow detection bridge 650 for measuring the flow rate. A constant voltage V3 is supplied from the power supply circuit 622 to one end of the heat generation control bridge 640 through a terminal 626, and the other end of the heat generation control bridge 640 is connected to a ground terminal 630. Further, a constant voltage V2 is supplied from the power supply circuit 622 to one end of the flow detection bridge 650 through a terminal 625, and the other end of the flow detection bridge 650 is connected to a ground terminal 630.

The heat generation control bridge 640 includes a resistance 642 that is a temperature measurement resistive element having a resistance value changed based on the temperature of the heated air 30, and the resistance 642, a resistance 644, a resistance 646, and a resistance 648 configure a bridge circuit. A potential difference between an intersection point A of the resistance 642 and the resistance 646, and an intersection portion B of the resistance 644 and the resistance 648 is input to the input circuit 614 through terminals 627 and terminal 628, and the CPU 612 controls the current supplied from the potential transistor 606 such that the potential difference between the intersection point A and the intersection point B becomes a predetermined value, i.e., zero volts in this embodiment, to control the calorific value of the heat-generating element 608.

The flow detection bridge 650 is configured from the four temperature measurement resistive elements of the resistance 652, the resistance 654, the resistance 656, and the resistance 658. These four temperature measurement resistive elements are arranged along the flow of the air 30. The resistance 652 and the resistance 654 are arranged at the upstream side of the heat-generating element 608 in the flow path of the air 30, and the resistance 656 and the resistance 658 are arranged in the downstream side.

A potential difference between an intersection point C of the resistance 652 and the resistance 656, and an intersection point D of the resistance 654 and the resistance 658 is input to the input circuit 614 through terminals 631 and 632. The CPU 612 outputs an electrical signal that indicates the flow rate of the air 30 from the terminal 662, based on a measurement result.

At this time, the CPU 612 searches for data that indicates a relationship between the potential difference and the flow rate of the main passage stored in the memory 618, based on the potential difference between the intersection point C and the intersection point D of the flow detection bridge 650, and obtains the flow rate of the main passage. The terminals 664 and 662 illustrated in FIG. 20 are configured as the leads 102b exposed from the resin mold portion 104 of FIG. 2A.

Figure 11:
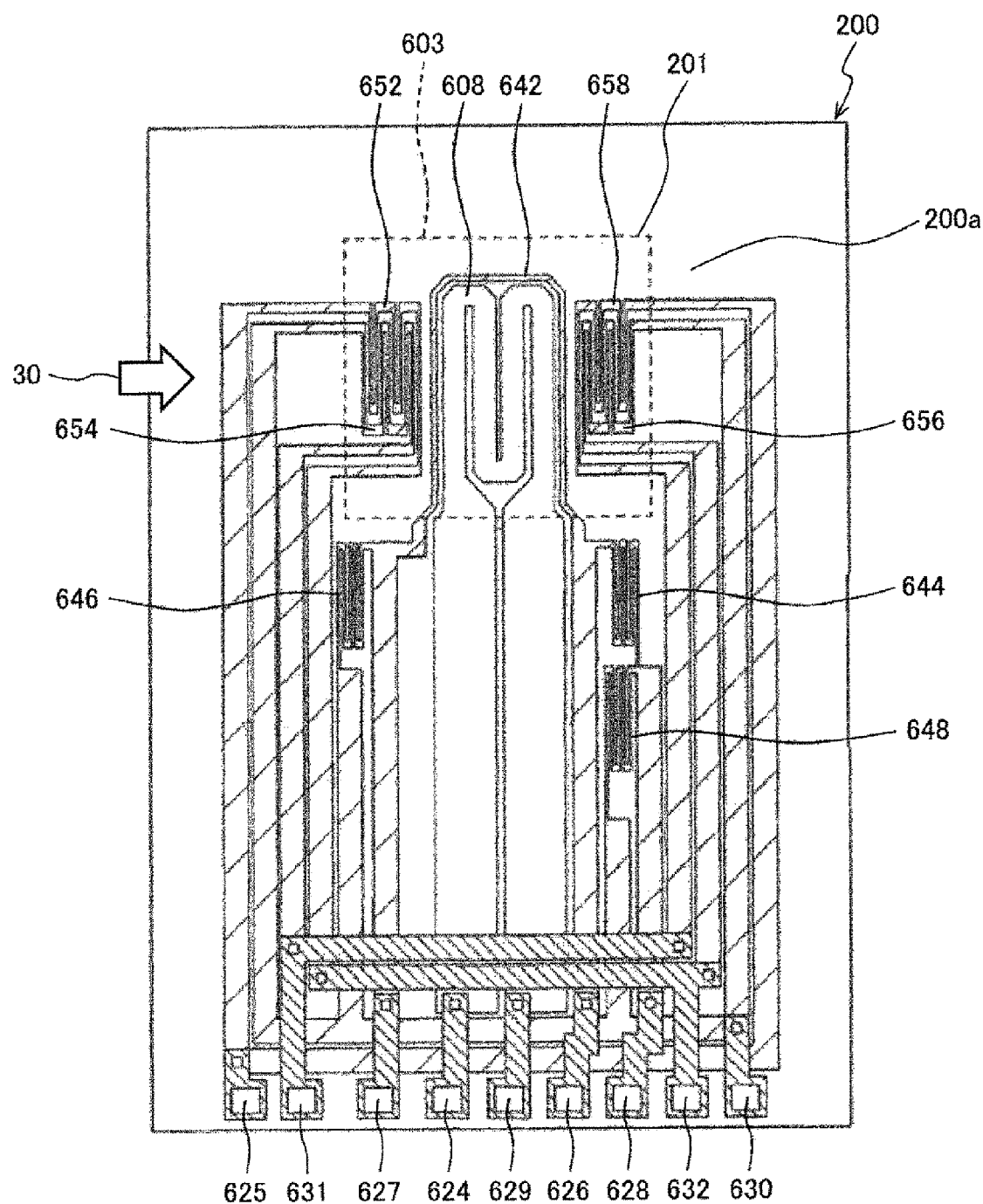
FIG. 11 is a configuration diagram of a resistance pattern illustrating a circuit arrangement of the flow detection portion illustrated in FIG. 10.

Next, the flow detection portion 200a configured in the air flow measurement element 200 will be described using FIG. 11. FIG. 11 is a configuration diagram of a resistance pattern that indicates a circuit arrangement of the flow detection portion 200a of FIG. 10.

The flow detection portion 200a is made as a square semiconductor chip.

The square diaphragm 201 with a thick semiconductor chip is formed in the flow detection portion 200a. A void 202 is formed in the back surface side of the diaphragm 201.

The heat-generating element 608 is provided in the central portion of the diaphragm 201. The resistance 642 that configures the heat generation control bridge 640 is provided in a periphery of the heat-generating element 608. The resistances 644, 646, and 648 that configure the heat generation control bridge 640 is provided outside the diaphragm 201.

Further, the resistance 652 that is an upstream temperature measurement resistive element and the resistance 654, and the resistance 656 that is a downstream temperature measurement resistive element and the resistance 658 are arranged to sandwich the heat-generating element 608.

Further, both end portions of the heat-generating element 608 are respectively connected to the terminals 624 and 629. Here, as illustrated in FIG. 10, the current supplied from the transistor 606 to the heat-generating element 608 is applied to the terminal 624, and the terminal 629 is grounded as ground.

The resistance 642, the resistance 644, the resistance 646, and the resistance 648 that configure the heat generation control bridge 640 are connected, and connected to the terminals 626 and 630. Further, the connection point between the resistance 642 and the resistance 646 (intersection point A), and the connection point between the resistance 646 and the resistance 648 (intersection point B) are connected to the terminal 627 and the terminal 628. Further, the connection point between the resistance 654 and the resistance 658 (intersection point D) is connected to the terminal 631. The connection point between the resistance 652 and the resistance 656 (intersection point C) is connected to the terminal 632.

Note that the present invention is not limited to the above-described embodiment, and includes various modifications. For example, the above-described embodiment has been described in detail for easy-to-understand the present invention, and is not necessarily limited to one that includes all configurations. Further, other configurations can be added to/deleted from/replaced with a part of the configuration of the embodiment.

REFERENCE SIGNS LIST

10 Lower mold
12 Upper mold
201 Diaphragm
14 Insert
15 Height adjustment mechanism
16 Resin film
17 Cavity portion
19a, 19b, 19c, and 19d Inside-insert push-in position
22a and 22b Lower mold push-in end portion
23a and 23b Outside-insert push-in position
100 Circuit package
102 Lead frame
102a Lead
103 LSI
104 Resin mold portion
111 Plate
112 and 113 Wire
116 Ventilation passage
117 First adhesive tape
118 Second adhesive tape 200 Air flow measurement element
200a Flow detection portion
202 Cavity
202a Substrate inclined portion
203a, 203b, 203c, and 203d Opening edge of cavity 202
300 Thermal air flow meter

The invention claimed is:

1. A method of manufacturing a thermal flow meter, the method including:
supporting a gas flow measurement element on a support member, the gas flow measurement element including a cavity portion surrounded by a substrate inclined portion inclined to a substrate surface such that a cross section vertical to the substrate surface is reduced from one substrate surface side to the other substrate surface side, a diaphragm that covers the cavity portion at the other substrate surface side, and an electrical resistive element formed in the diaphragm,
including a circuit package in which the gas flow measurement element and the support member are covered with a resin portion formed with a mold,
arranging the diaphragm of the circuit package in a sub-passage that takes in a gas, and measuring a flow rate of the gas, using the electrical resistive element, the method comprising:
setting the mold such that an acting portion of pressure force by the mold that molds the resin portion is positioned outside the substrate inclined portion in an entire periphery of the diaphragm,
wherein an adhesive layer is provided in the multilayer structure of the gas flow measurement element and the support member,
wherein the support member includes a lead member made of metal that also functions as a wiring member of the circuit package, and a plate provided between the lead member and the gas flow measurement element, and the lead member and the plate are glued with a first adhesive tape, and the plate and the gas flow measurement element are glued with a second adhesive tape.

2. The method of manufacturing a thermal flow meter according to claim 1, wherein
a thickness dimension of the second adhesive tape is made smaller than a thickness dimension of the first adhesive tape.

3. The method of manufacturing a thermal flow meter according to claim 2, wherein
the mold includes an upper mold that covers a side where the gas flow measurement element is provided with respect to the support member, a lower mold that covers an opposite side, and an insert that is assembled in an opening portion provided in a portion of the upper mold, the portion facing the diaphragm, and covers the diaphragm,
in the insert, a recessed portion is formed in the portion facing the diaphragm, the portion facing the diaphragm and the diaphragm are in a non-contact state, an inner peripheral-side edge in a protruding portion that is formed in a periphery of the recessed portion and applies pressure force to the gas flow measurement element is arranged outside the substrate inclined portion, and
the mold is brought contact with the lead member from an opposite side to a position where the insert comes in contact.

4. The method of manufacturing a thermal flow meter according to claim 3, wherein
a resin film is provided on surfaces of the recessed portion and the protruding portion of the insert, and
a contact portion of the resin film provided on the surface of the protruding portion and the gas flow measurement element is arranged outside the substrate inclined portion.

* * * * *